Dec. 17, 1935.  W. E. HASELWOOD  2,024,446
VOLUME CONTROL CIRCUIT
Filed May 27, 1931  3 Sheets-Sheet 1

Inventor.
Willis E. Haselwood
By Mowry Jackson Cortelyou Dunner
Attys.

Dec. 17, 1935.                    W. E. HASELWOOD                    2,024,446
                                VOLUME CONTROL CIRCUIT
                                Filed May 27, 1931                  3 Sheets-Sheet 2

Inventor:
Willis E. Haselwood
By
Attys.

Dec. 17, 1935.  W. E. HASELWOOD  2,024,446
VOLUME CONTROL CIRCUIT
Filed May 27, 1931  3 Sheets-Sheet 3

Inventor:
Willis E. Haselwood.
By Brown Jackson Boettcher Dienner
Attys.

Patented Dec. 17, 1935

2,024,446

UNITED STATES PATENT OFFICE 2,024,446

VOLUME CONTROL CIRCUIT

Willis E. Haselwood, Elkhart, Ind., assignor to Chicago Telephone Supply Company, Elkhart, Ind., a corporation of Indiana Application May 27, 1931, Serial No. 540,260

9 Claims. (Cl. 250—20)

This invention relates to volume control for radio sets and the like, and has for its principal object the production of new and improved circuit arrangements for controlling the volume of such devices by simple and inexpensive controllers.

Various arrangements have been used in the prior art, of which I am aware, to control the volume of radio sets and other similar devices employing thermionic tubes to amplify the signals received on the input circuit of the devices. In direct current tubes having filaments heated by current from a storage battery or the like, a very simple control can be effected by controlling the temperature of the cathode through the use of a simple and inexpensive rheostat connected in series with it. In tubes having a heater energized by alternating current which heats the cathode by conduction and radiation, such an arrangement cannot be satisfactorily employed, and in the prior art various substitute arrangements have been resorted to. The most common of these arrangements consists of a high resistance potential divider or so-called potentiometer connected from the antenna to ground and having the rider connected to the input terminal of the device, so that the potential delivered through that input terminal can be adjusted by varying the position of the rider upon this fixed resistance.

A control of this type, while satisfactory where the signals do not vary through wide limits of intensity, is not adequate to meet the requirements of every day practice wherein the signal strength varies from very weak signals to very strong ones. To remedy this situation, various volume control arrangements are employed using multi-unit controllers in which, in addition to the antenna potentiometer, a similar device is included elsewhere in the circuit so that control is exercised at two points.

Even with arrangements of this type, which are obviously more expensive than a simple single unit control, the results have not been altogether satisfactory since, if the resistance values are to be sufficient to permit the requisite range of volume control over wide ranges of signal strength, the control unit must be unduly large and expensive. Furthermore, with an arrangement of this kind, overloading of the tubes and consequent distortion frequently is encountered, and because of this the arrangement is not altogether satisfactory.

Other prior art volume control arrangements have combined with the variable antenna shunt, arrangements for simultaneously varying the mutual conductance of the thermionic tubes of the device, with the result that a somewhat more satisfactory control is achieved. This arrangement as practical heretofore, does not result in a volume control that is altogether satisfactory, but permits employment of simpler and cheaper control circuits and has been extensively used where cost is the prime consideration. As practiced heretofore, this arrangement has not resulted in straight line attenuation of volume, which obviously is desirable, or in the maintenance of a low distortion level.

In my present invention I have provided an improved volume control of this latter type, in which the units employed in the control are simple and inexpensive and in which quiet, smooth volume control can be achieved over a wide range of signal strengths.

In the preferred embodiment of my invention, I control volume by varying the alternating potential applied to the input circuit of the device and simultaneously varying the mutual conductance of the thermionic tubes employed in the device. To accomplish this, I shunt the input circuit of the device with a relatively high value resistance which is connected to the mid-point of two resistances located in series between the cathode circuit of the amplifier and ground, a rider at ground potential being provided to engage the shunt resistance and thereby vary its effective value and to simultaneously vary the value of resistance connected between the cathode circuit and ground. This latter variation produces a variation in the potential difference between the cathode and grid circuits of the thermionic devices, with a result that the mutual conductance of the thermionic devices are varied.

This arrangement makes use of the existing relation between potential difference between the cathode and grid of modern thermionic devices and the mutual conductance of the device, and permits obtaining a very satisfactory control by the use of simple and relatively inexpensive resistors. The addition of a fixed resistor which is shunted by a part of the variable input shunt overcomes the most serious of objections raised against the similar prior art arrangements, and permits more accurate control by achieving a practically straight line attenuation with simple control units. Since the rider of the variable shunt carries a decreasing proportion of the anode and bleeder current as it is moved away from the cathode, the effect of slight changes in contact resistance encountered as the rider is moved over its resistor produces smaller and smaller disturbances in the circuit, and quiet operation results. The circuit arrangements of my invention may be used with all types of tuned or untuned coupling and with direct current sets or with alternating current sets employing tetrodes or triodes, and is therefore quite universal in its application.

In the commercial embodiment of my invention, I prefer to incorporate the fixed resistor connected between the ground end of the shunt resistance and ground, in the unit with the shunt resistance itself, so that the two may be accurately proportioned and adjusted to the proper ohmic value to secure most satisfactory results. The combining of the resistors in this manner permits their assembly in the radio sets or similar devices without added cost. While this arrangement is preferable, it is by no means essential, and if desired the units may be made and mounted separately, within the teachings of my invention.

Now to acquaint those skilled in the art with the teachings of my invention, reference is had to the accompanying drawings in which a preferred embodiment of it is shown by way of example and in which.

Figure 1:
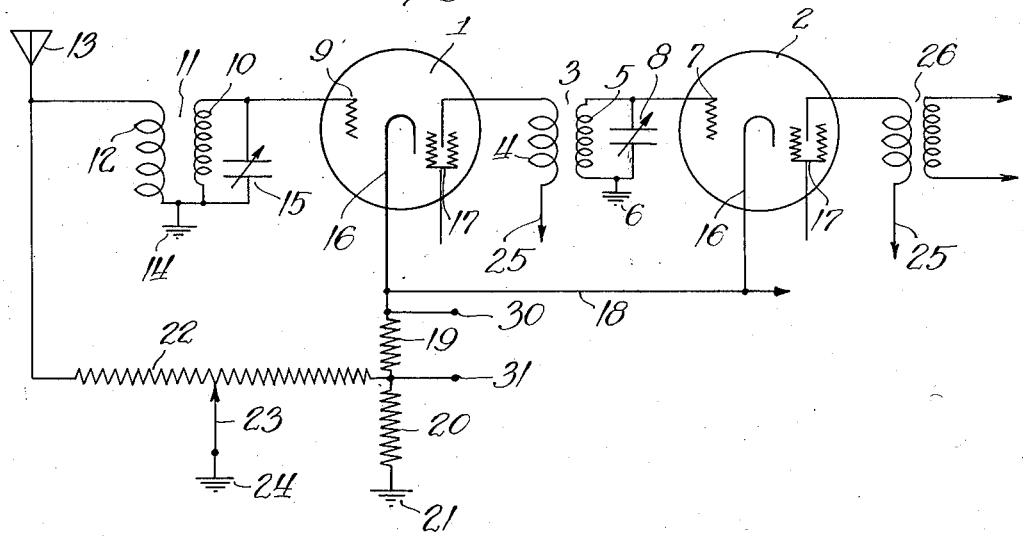
Figure 1 is a schematic diagram of my invention applied to an amplifier circuit employing heater type tubes.

Referring now to the drawings in more detail, in Figure 1, I have shown a typical amplifier comprising thermionic tubes 1 and 2 which are coupled together by a transformer 3, although any coupling means might be used. As shown, this coupling is made through an air core transformer whose primary 4 is connected in the anode circuit of the tube 1 and whose secondary 5 is connected between ground 6 and the grid 7 of the tube 2 with a tuning condenser 8 in multiple with it. This type of coupling is the usual tuned coupling, and is shown by way of example only.

The grid of the tube 1 is similarly connected to a secondary 10 of the input transformer 11, the primary 12 of that transformer being connected to the antenna 13 and to ground at 14. A tuning condenser 15 is connected in multiple with the secondary winding 10, and the input circuit is thereby tuned to respond to a particular frequency.

As shown, the cathodes 16 of the tubes 1 and 2 are heater type cathodes, and the alternating current element by which they are raised to operating temperature has been omitted from the drawings as unnecessary. Tubes 1 and 2 are shown as provided with shielding grids 17, which may be omitted if desired within the teachings of my invention.

The cathodes of the amplifiers 1 and 2, and other amplifiers which may be employed for volume control, are preferably coupled together by conductor 18, and connected to a fixed resistor 19 which in turn is connected to a second fixed resistor 20 leading to ground at 21.

A relatively high value fixed resistor 22 is connected between the antenna 13 and the junction point of the resistors 19 and 20, the resistor 22 being provided with a movable rider 23 which is connected to ground at 24. Obviously, when the rider is moved to the extreme left-hand position of the resistor 22 the antenna pick-up coil 12 of the input transformer 11 is short circuited and therefore incapable of inducing signal potentials in the secondary winding 10. As the rider 23 is moved to the right, the resistance of the shunt around the primary winding 12 of this transformer is increased and a portion of the antenna current is thereby permitted to flow through this winding with the result that a potential is induced across the terminals of the secondary winding 10 of the transformer to excite the grid 9 of the tube.

Figure 4:
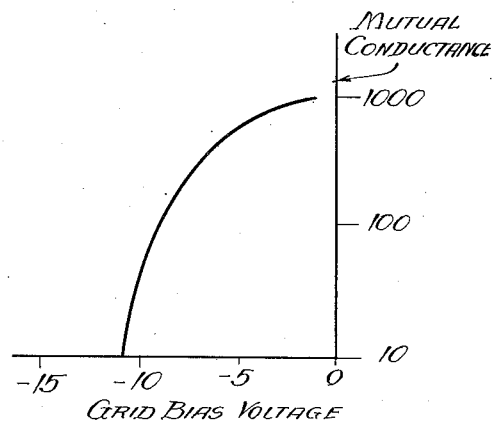
Figure 4 is a graph plotted between grid bias voltage and mutual conductance of a standard make-up tube showing the relation between these factors.

The anode current supply, which may be either a battery or a so-called B eliminator, is connected to terminal 25 of the coupling transformers 3 and 26, and the opposite terminal of this source of current is connected to ground. The return circuit of this source of anode current being connected to ground, the current delivered by it, in returning to the cathodes, flows through resistors 20 and 19 in series, and also through that part of the resistor 22 which is to the right of the contactor 23 and in parallel with the resistor 20. A potential gradient is thereby set up across the resistors, with the result that the potential of the cathode 16 is positive with respect to ground and since the grid 9 of the tube 1 and grid 7 of the tube 2 are connected to ground that is, are at ground potential only with respect to their direct current component, the cathodes of those tubes are positive with respect to the grids. It is to be contemplated that the grid will be grounded only with respect to the direct current component, but not with respect to radio frequency impulses, since if the grid were at ground potential for both high frequency alternating current and direct current, the system would be inoperative. In other words, the grids are negative with respect to the cathode, which is the proper condition for efficient amplication by the tubes, as is well understood by those skilled in the art. As will be seen in Figure 4, in which the negative potential on the grid with respect to the cathode is plotted as the abscissa and the mutual conductance of the tube in micromhos as the ordinate, the mutual conductance of the tube falls as the amount of negative biasing voltage impressed upon the grid is increased, this fall being gradual when the voltage on the grid approximates zero, and being more rapid as the negative potential on the grid is increased.

Turning now to Figure 1, as the rider 23 is moved to the right, the value of that part of the resistance 22 between it and the junction of resistors 19 and 20 is decreased, and since this resistance is in multiple with the resistor 20, the effective overall resistance of the combination is decreased and consequently the IR drop produced by the current return to the cathode 16 is decreased, and the effective bias on the grids 9 and 7 is thereby likewise decreased. Simultaneously, the resistance value of the shunt around the pick-up coil 12 is increased, so that that coil is enabled to induce stronger alternating potential in the secondary winding 10 of the transformer 11, which potential is of course impressed upon the grid 9 of the tube 1. By this arrangement, when weak signals are to be received, or when great volume is desired, the resistance value of the shunt around the winding 12 is increased, and the signal voltage impressed upon the grid 9 of the first tube 1 is great. At the same time, because of the change in grid bias the mutual conductance of the tube is increased and the signal may therefore be amplified without danger of overloading the tubes and thereby causing them to distort the signals. Conversely, when a strong signal is being received, or less volume is desired, and the rider 23 is moved nearer the antenna end of the resistor 22, the mutual conductance of the tubes is decreased and simultaneously the signal voltage impressed upon the grid is decreased so that the signal can be amplified without danger of overloading the tubes and thereby causing them to distort the signal.

Obviously, if the resistors are proportioned in such a manner to correlate the change in mutual conductance of the tubes with respect to the voltage impressed upon the grids of the tubes, straight line, or practically straight line attenuation of signals can be obtained. This is very advantageous since if true straight line attenuation is achieved, it is just as easy to alter the strength of a strong signal as it is the strength of a weak signal; that is, for a given movement of the rider 23 between any two points on the resistor 22, a fixed gain or loss in signal strength can be achieved.

Figure 3:
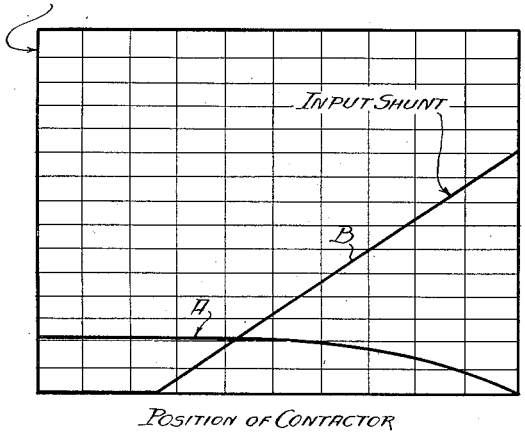
Figure 3 is a graph illustrating the resistance variations obtained with the device of my invention.

With reference to Figure 3 in which the curve B represents the resistance from the antenna end of the resistor 22 as the rider 23 is moved from left to right over it, the antenna end of the resistor is wound with a wire having relatively low unit resistance so that a given movement of the rider produces but a small change in the resistance of the antenna-ground circuit. The curve A represents the effective resistance from ground to the cathode 16 of the tube, and since the variations produced by a given movement of the contactor when it is near the left-hand end of the resistor 22 are small, the resultant change in resistance from ground to the cathode is small. It will be remembered that at this time the grid is operating at or near its maximum negative bias and because of the steepness of the curve, Figure 4, a small change in grid bias will produce a comparatively large change in the mutual conductance of the tube.

As will be seen by curve B in Figure 3, as the contactor approaches the right-hand end of the resistor 22, a greater change in resistance per unit movement of the contactor is produced and consequently greater change in the shunt value and in the mutual conductance of the tube is likewise produced. By properly proportioning these factors, substantially straight line attenuation of the signal is obtained, and the ease of operation of the volume control is thereby greatly enhanced. Straight line attenuation is further aided by breaking up the resistor 22 into a plurality of sections having different resistance change per degree of movement of the rider 23. This practice is old. However, in my improved arrangement, the most critical resistance with regard to minimum distortion, is the resistor 20, which is a fixed resistor and may therefore be most easily held within close resistance limits. The ohmic value of this resistor 20 is much lower than the value of the shunt resistor 22, and the resistor 20 is therefore the controlling factor in the effective overall value of the parallel resistors. This is particularly true when the rider 23 is at or near the antenna end of the resistor 22, and therefore the resistance gradient of resistor may be determined to meet the requirements of the antenna shunt circuit without altering the grid bias voltage in an undesirable manner.

If desired, a bleeder circuit may be used with this control and the ground return end of the bleeder circuit connected either to terminal 30 or 31, Figure 1. If connected to terminal 31, the current in such bleeder circuit returning to ground does not affect the potential of the cathode with respect to ground, when the rider on 22 is at that point but does affect it as soon as the rider is moved onto the resistor 22. If the bleeder circuit is connected to terminal 30, the current in it returning to ground must flow through resistor 19 and will increase the IR drop in that resistor with a result that the grid bias is increased thereby. By suitably adjusting the value of the resistors 19, 20 and 22 with respect to the current strength in the anode supply return circuit and the bleeder current, proper grid bias may be maintained upon the tube when the bleeder circuits are connected in this manner.

Figure 2:
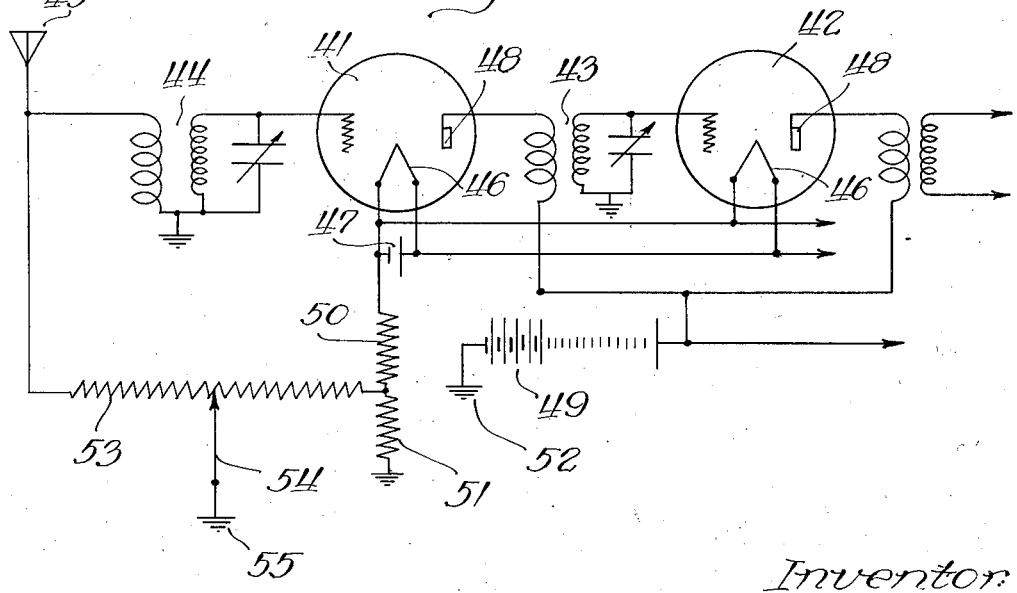
Figure 2 is a similar schematic diagram showing the application of my invention to a circuit employing direct current filament type tubes.

As mentioned, while primarily designed for modern radio sets employing alternating current tubes of the heater type, my invention may also be applied to devices employing direct current tubes of the filament type and employing anode batteries or so-called B eliminators in connection therewith. Such an adaptation of my invention is shown in Figure 2. In this figure, tubes 40, 41 and 42 are direct current type tubes, coupled together by suitable means such as a transformer 43 which it will be observed is connected in the same manner as is the transformer 3 of Figure 1. The input transformer 44 by which the tube 41 is connected to the aerial 45 is likewise connected in the same manner.

The filaments 46 and 47 of the tube are energized by a suitable source of direct current 47, and the plates or anodes 48 are energized by a B battery supply, shown as batteries 49 in Figure 2. Obviously, instead of the battery shown, any preferred type of so-called B battery eliminator may be substituted within the teachings of my invention.

The filaments 46 are connected to ground through resistors 50 and 51, and the anode current supply is connected to ground at 52. Consequently the anode circuit includes the resistors 50 and 51 with a result that the IR drop set up therein by the current returning to the filament places those filaments at a positive potential with respect to ground, and since the grids of the tubes are at ground potential, they are negative with respect to the filament and proper bias is produced upon them. The volume control resistor 53 is connected from the antenna 45 to the junction point of resistance 50 and 51 as before, and equipped with a rider 54 connected to ground at 55 by which the strength of the signal impressed upon the grid of the tube 41 and the grid bias of that tube is simultaneously controlled. The details of operation of this circuit is the same as hereinbefore explained, and need not be repeated in detail at this time.

Figure 5:
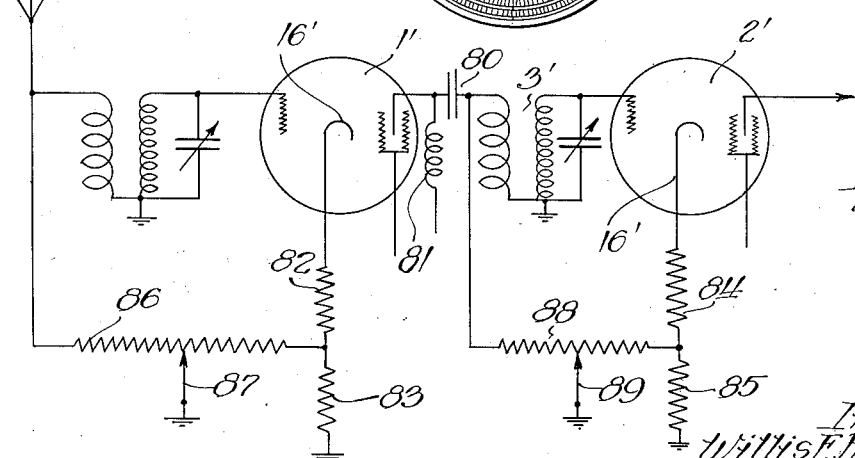
Figure 5 is a schematic diagram of a circuit employing a multi-unit adaptation of my invention.

In Figure 5, I have shown an adaptation of my invention in which the voltages impressed upon the grids of two tubes may be independently controlled, with the grid bias of each tube controlled simultaneously therewith, or if desired, the units may be operated in tandem. Obviously, since distortion is a function of the ratio of grid bias to signal strength, the second tube of a cascade amplifier is the limiting factor in determining the maximum allowable bias with which the tubes may be supplied when working together. If the controls of these factors are separated, the ratios need not be the same in the two tubes and consequently a higher grid bias may be used on the first than on the second tube and the range of control of the device thereby increased. In Figure 5 it will be noted that tubes 1' and 2' are coupled together by a transformer 3' as before and that a condenser 80 is included in the primary circuit of this transformer. The anode current is supplied through a radio frequency choke 81 from any convenient source, not shown, the return circuit of which is grounded as before. The cathodes 16' of the two tubes are individually connected to ground through resistors 82, 83 and 84, 85, respectively. A resistor 86 is connected between the antenna and the junction of resistances 82, 83 and provided with a grounded rider 87 by which the effective value of the shunt is controlled. The values of resistors 82, 83 and 86 are proportioned to give the desired bias on the grid of tube 1', which bias is of course varied by a variation of the position of rider 87, as hereinbefore set out. Similarly, a fixed resistor 88 is connected between the junction of the primary of transformer 3' and condenser 80 and the junction of the resistors 84, 85, and is provided with a grounded rider 89. These resistances 84, 85 and 88 are proportioned to give the desired maximum bias on the grid of tube 2', which bias is altered by a movement of rider 89, as before.

Riders 87 and 89 may be controlled separately but preferably are arranged for tandem control, the particular arrangement used being optional. By using a tandem arrangement, the danger of increasing the efficiency of tube 1' to such an extent that its output may overload tube 2' and cause distortion is overcome, since the two tubes are controlled simultaneously but at different ratios.

Figure 7:
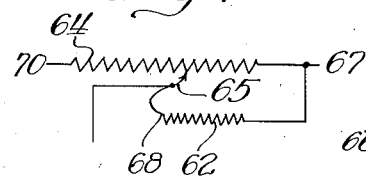
Figure 7 is a schematic diagram of the resistor shown in Figure 5.

In the commercial adaptation of my invention I find it advantageous to combine the fixed resistances 20 and 22 of Figure 1 or 51 and 53 of Figure 2 into a single unit which may be assembled into the radio set or other similar device, as a unit. By fabricating the resistors in this manner, the proper proportioning of their resistance values with respect to each other can be made by the manufacturer with the full assurance that the pairs of resistors thus formed will not be separated or mixed with other resistors by the set manufacturer. In Figure 7, I have shown a commercial embodiment of these resistors in a single unit. This unit, which may be any preferred type of resistor, preferably consists of a metallic cup-like shell 60 around the inside wall of which is an insulator 61 adjacent which is a resistance strip 62. On the inside of this resistance strip 62 is a second insulator 63 and inside of it a second resistor 64. A contactor 65 pivoted on a shaft 66 concentrically located in the casing 60 engages the resistance 64. Thus it will be seen that the resistor 22 of Figure 1 is the resistance unit 64 of Figure 5 and the resistance 20 of Figure 1 is the resistor 62, while the rider 23 of Figure 1 is the rider 65 of Figure 5.

Figure 6:
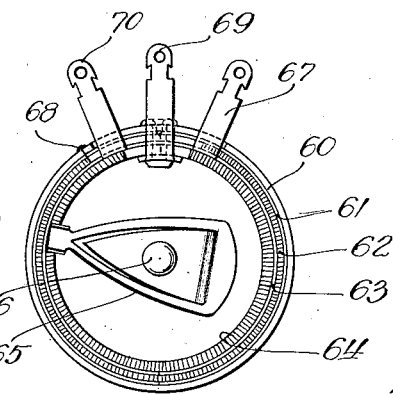
Figure 6 is a plan view of a preferred form of rheostat for use as a volume control.

As will be seen in Figure 6, one end of the resistor 64 and one end of resistor 62 are connected together in common and led out through the terminal 67 which is insulated from the shell 60 in any preferred manner. The free end 68 of the resistor 62 is connected to rider 65 in any preferred manner such as by soldering the end of the wire to the shell 60. The rider, being mounted upon the shell 60 through the shaft 66 is accessible through the terminal 69 which is connected to that shell. Consequently the attachment of the free end of the winding 62 to the shell is equivalent to connecting it to the rider 65. The free end of the winding 64 is connected to terminal 70 which in turn is insulated from the shell and from the winding 62.

The particular type of shell and terminals therefor and the method of clamping the resistance units in the shell is not of the essence of the present invention.

From the foregoing it will be apparent that the inclusion of the resistor 20 between the cathode end of the resistor 22 and ground, is advantageous for many reasons. Preferably, the resistor 22 is a wire wound resistance which is engaged by a rider 23 making sliding contact, and as this rider moves from wire to wire on the resistor 22 there will be some change in contact resistance. If the resistor 20 were omitted, the entire anode current return would be carried by the rider at all positions and any slight change in contact resistance would produce a very noticeable noise in the receiving apparatus. By shunting the resistance 20 between the cathode end of resistance 22 and ground, the rider is not called upon to carry the entire anode current as it moves across the resistor and the slight changes in contact resistance which may be encountered are not so noticeable.

Figure 8:
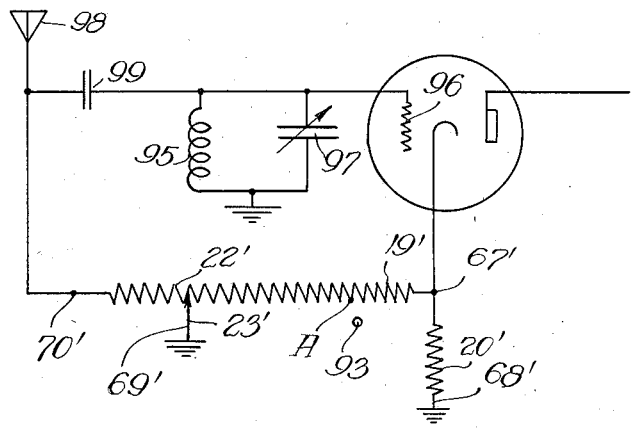
Figure 8 is a schematic circuit diagram of a modified form of my invention.
Figure 9:
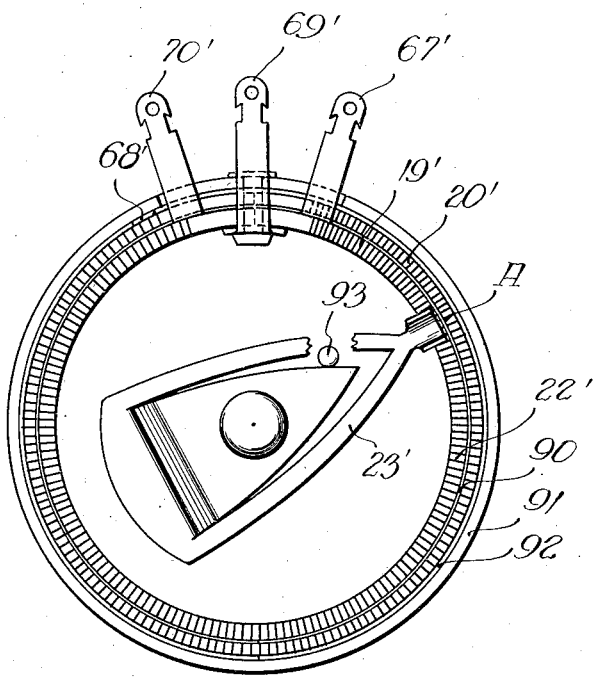
Figure 9 is a plan view of the rheostat used in the circuit shown in Figure 8.

In Figure 8, I have shown a slightly modified circuit in which the resistor 19', which corresponds to 19 in Figure 1, is also incorporated in the resistance unit. As will be apparent from Figure 9, the resistance 19' is a part or continuation of the shunt resistor 22' and is wound integral with it. The resistor 20' is located outside of resistors 19' and 22' and is insulated therefrom by a suitable insulator 90 and from the shell or frame of the rheostat 91 by an insulator 92. The rider 23' is journaled in the shell 90, as before, and strikes a stop 93 when its contactor is engaging the junction A of resistors 19' and 22', which stop prevents the rider from short circuiting resistor 19'. The minimum value of the shunt around resistor 20' is, therefore, the value of the resistor 19', and by proper proportioning resistors 19' and 20', the desired grid bias can be secured. The resistors 20' and 19' are connected together through terminal 67' which is placed between them. Resistors 19' and 22' are connected together at A, and the free end of resistor 22' is connected to terminal 70'. The free end of resistor 20' is grounded as by soldering to the shell 91, as shown at 68'.

In Figure 8, I have shown a single inductance 75

95 connected between ground and the grid 96 of the first tube, with a tuning condenser 97 in multiple with it. The grid is connected to the antenna 98 through a condenser 99. This illustrates the usual tuned impedance type of coupling now commonly used in radio sets, and also illustrates the adaptability of my volume control to sets of this type. In fact, the volume control of my invention may be used with any one of the tuning arrangements now commonly used.

While I have shown my invention in connection with a radio set equipped with air core transformers which couple its thermionic tubes together, I have done so by way of example only as obviously the invention may be applied to other devices. The pick-up device 13, shown as an antenna, may well be any pick-up device such as the magnetic pick-up of a phonograph, or other similar device, and the transformers may be a transformer suitable for use in connection with such a device, within the teachings of my invention.

Having thus complied with the statutes and shown and described a preferred embodiment of my invention, what I consider new and desire to have protected by Letters Patent is pointed out in the appended claims.

What is claimed is:

1. The combination with a thermionic tube whose grid is connected through an impedance to ground and to a pick-up device, of a fixed value resistor connected between the cathode of said tube and ground, a pair of serially connected fixed resistors connected between the pick-up device and the junction of said cathode and the first resistor, and a rider connected to ground and engaging the first of said serially connected resistors to place a part of it and all of the other serially connected resistor in parallel with said first resistor.

2. A volume control for a thermionic tube having a grounded grid and having a grounded anode return circuit and whose grid is coupled to an antenna, comprising a high value resistor connected between the cathode of the tube and the antenna, a fixed resistor connecting said high value resistor to ground, and a grounded rider engaging said high value resistor and movable thereover to vary the resistance between the antenna and ground and to simultaneously vary the value of resistance in the shunt of said fixed resistor to thereby vary the effective value of the resistance between the cathode and ground.

3. A volume control for a thermionic tube having an anode, a cathode, and a grounded grid, and whose grid is coupled to an antenna, comprising a high value resistor connected between the cathode of the tube and the antenna, a fixed resistor connecting said high value resistor to ground, a grounded rider engaging said high value resistor and movable thereover to vary the resistance between the antenna and ground and to simultaneously vary the value of resistance in the shunt of said fixed resistor to thereby vary the effective value of the resistance between the cathode and ground, and means for maintaining a fixed minimum value of resistance betwen said cathode and ground.

4. The combination of a thermionic amplifier having a grid, a cathode, and an anode, a tuned circuit having one of its ends connected to said grid and the other to ground, an antenna, means for coupling said antenna to said tuned circuit, a fixed resistor means connecting said cathode and ground, a high value resistor shunted between said antenna and said cathode, a rider connected to ground and engaging said high value resistor to place part of it in an antenna-ground circuit and the rest of it in multiple with said fixed resistor, said rider being movable to vary the value of the parts of said resistor, and a stop for limiting the movement of said rider to thereby establish a minimum value for the part in multiple with said fixed resistor.

5. The combination with a radio set having an antenna coupled to the grid of a thermionic tube having a cathode, said grid being grounded, of a pair of resistors serially connected between said cathode and ground, a shunt resistance connected between the antenna and the junction of said serially connected resistors, and a rider connected to ground and operable over said shunt resistance.

6. A volume control for an amplifier using thermionic tubes having an anode, a cathode, and a grounded grid, said grid being coupled to a pick-up device, comprising a resistor connected to the cathode, a second fixed value resistor connected between said first resistor and ground, a high value resistor connected between said pick-up device and the junction of said first two resistors, and a grounded rider engaging said last named resistor.

7. A volume control for an amplifier using thermionic tubes having an anode, a cathode, and a grounded grid, said grid being coupled to a pick-up device, comprising a resistor connected to the cathode, a second fixed value resistor connected between said first resistor and ground, a high value resistor connected between said pick-up device and the junction of the first two resistors, a grounded movable rider engaging said last named resistor, and a bleeder circuit connection to said junction point.

8. A volume control for an amplifier of the class described having an anode, a cathode, and a grounded grid coupled to a pick-up device, comprising a resistor connecting said cathode directly to ground, a high value resistor comprising a pair of integrally wound resistance units connected between said pick-up device and said cathode, a grounded movable rider engaging one of said resistance units, means for limiting the minimum value of the shunt effected by said high value resistor between said pick-up device and said cathode comprising a stop for preventing said rider from engaging said other resistance unit.

9. A volume control for an amplifier of the class described having an anode, a cathode, and a grounded grid coupled to a pick-up device, comprising a resistor, a terminal at one end of said resistor, a connection between said terminal and said cathode, a second resistor insulated from said first resistor, said second resistor being divided into two serially connected resistance units, one of said units being connected to said terminal, a ground connection at the other end of said first resistor, a grounded rider engaging the unit of said divided resistor which is not connected to said terminal, the other end of said last named unit being connected to said pick-up device, and stop means for preventing said rider from passing the connection point of said two resistance units.

WILLIS E. HASELWOOD.